United States Patent
Kim et al.

(10) Patent No.: US 9,596,225 B2
(45) Date of Patent: Mar. 14, 2017

(54) OUT-OF-VEHICLE DEVICE INTERFACE APPARATUS AND METHOD FOR PROTECTING IN-VEHICLE NETWORK

(71) Applicant: ELECTRONICS AND TELECOMMUNICATIONS RESEARCH INSTITUTE, Daejeon (KR)

(72) Inventors: Kyoung-Ho Kim, Gokseong-gun (KR); Jeong-Han Yun, Daejeon (KR); Heemin Kim, Daejeon (KR); Manhyun Chung, Daejeon (KR); Woonyon Kim, Daejeon (KR); Jungtaek Seo, Daejeon (KR); Eung Ki Park, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 39 days.

(21) Appl. No.: 14/695,100

(22) Filed: Apr. 24, 2015

(65) Prior Publication Data

US 2016/0014105 A1    Jan. 14, 2016

(30) Foreign Application Priority Data

Jul. 9, 2014    (KR) ................ 10-2014-0085870

(51) Int. Cl.
*G06F 7/04*        (2006.01)
*H04L 29/06*    (2006.01)
(Continued)

(52) U.S. Cl.
CPC .............. *H04L 63/08* (2013.01); *H04B 3/56* (2013.01); *H04L 63/10* (2013.01); *H04L 67/12* (2013.01); *H04W 4/046* (2013.01)

(58) Field of Classification Search
CPC ......... H04L 63/08; H04L 63/10; H04L 67/12; H04W 4/046; H04B 3/56
(Continued)

(56) References Cited

U.S. PATENT DOCUMENTS

2003/0009271 A1    1/2003   Akiyama
2010/0312417 A1    12/2010 Wakabayashi et al.
(Continued)

FOREIGN PATENT DOCUMENTS

JP    2003-046536 A    2/2003
JP    2007-027807 A    2/2007
(Continued)

*Primary Examiner* — Aravind Moorthy
(74) *Attorney, Agent, or Firm* — LRK Patent Law Firm

(57) ABSTRACT

An out-of-vehicle device interface apparatus includes a request message reception unit, a response message request unit, and a response message transmission unit. The request message reception unit receives a request message from an out-of-vehicle device, generates electrical signals in electric lines, and transfers the request message. The response message request unit requests response messages for the request message from one or more devices constituting an in-vehicle network based on one or more of the electric lines in which electrical signals have been generated. The response message transmission unit receives the response messages from the one or more devices, and transfers the response messages to the out-of-vehicle device via unidirectional communication.

15 Claims, 8 Drawing Sheets

(51) Int. Cl.
   *H04B 3/56*   (2006.01)
   *H04L 29/08*   (2006.01)
   *H04W 4/04*   (2009.01)

(58) Field of Classification Search
   USPC .......................................................... 726/3
   See application file for complete search history.

(56) References Cited

U.S. PATENT DOCUMENTS

2013/0010954 A1\* 1/2013 Falk .................. H04L 9/3236
                                                                   380/255
2014/0077972 A1\* 3/2014 Rathi .................... G07C 5/008
                                                                   340/902

FOREIGN PATENT DOCUMENTS

| JP | 2007-139478 A   | 6/2007  |
|----|-----------------|---------|
| JP | 2009-260571 A   | 11/2009 |
| JP | 2010-280314 A   | 12/2010 |
| JP | 2013-107453 A   | 6/2013  |
| JP | 2013-141947 A   | 7/2013  |
| JP | 2013-141948 A   | 7/2013  |
| KR | 20-0373557 Y1   | 1/2005  |
| KR | 10-2013-0043882 A | 5/2013 |
| KR | 10-2013-0136852 A | 12/2013 |
| KR | 10-2014-0086881 A | 7/2014 |

\* cited by examiner

OUT-OF-VEHICLE DEVICE INTERFACE APPARATUS AND METHOD FOR PROTECTING IN-VEHICLE NETWORK

CROSS-REFERENCE TO RELATED APPLICATION

This application claims the benefit of Korean Patent Application No. 10-2014-0085870, filed Jul. 9, 2014, which is hereby incorporated by reference herein in its entirety.

BACKGROUND

1. Technical Field

The present invention relates to out-of-vehicle device interface technology that is capable of protecting an in-vehicle network by applying a physical unidirectional communication structure to an out-of-vehicle device that is accessing a vehicle.

2. Description of the Related Art

With the recent development of information technology (IT), various sensors and control devices have been converted into a digital type. Accordingly, most existing device control methods based on physical manipulation have been converted into control methods using electronic devices.

A representative example of such conversion corresponds to the field of vehicles. Vehicles are combinations of many mechanical devices and sensors. In order to control such mechanical devices and the sensors, many pieces of electronic equipment are mounted on a vehicle. To exchange information between the vehicle and the pieces of electronic equipment and control them, a network is deployed inside the vehicle. Many functions for a vehicle can be implemented more efficiently and conveniently using the in-vehicle network.

General-purpose technologies are used to construct and use a network inside a vehicle (hereinafter referred to as an "in-vehicle network"), and a lot of information about the technologies is being disclosed. For this reason, the operating principles of technologies applied to a vehicle have become able to be easily learned, and thus the risk of the malicious use of the technologies based on the learning has increased. A representative example of such a risk is an auto-parking function. To perform auto-parking, it is necessary to check surrounding situations using sensors outside a vehicle and control functions, such as steering manipulation, acceleration manipulation and deceleration manipulation. It has already been known that the above-described functions can be illegitimately controlled based on the knowledge obtained through hacking using an on board diagnostics (OBD) interface. Furthermore, there has been formed a social consensus about a need for the security of a vehicle because it has been known that the above-described functions can be manipulated from a remote location regardless of the intention of a driver. In connection with this, Korean Patent Application Publication No. 10-2013-0136852 discloses a technology related to "CAN BUS separating apparatus and CAN communication security method using the same."

SUMMARY

At least one embodiment of the present invention is directed to the blocking of a path through which malicious behavior can be performed by applying physical unidirectional communication technology to an out-of-vehicle device that is accessing a vehicle.

At least one embodiment of the present invention is directed to protecting the lives of a driver and passengers within a vehicle by enhancing the security of an in-vehicle network.

At least one embodiment of the present invention is directed to enabling existing vehicle checking functions to be normally performed while preventing abnormal vehicle body control from being performed from the outside of a vehicle by using physical unidirectional communication technology.

In accordance with an aspect of the present invention, there, is provided an out-of-vehicle device interface apparatus, including a request message reception unit configured to receive a request message from an out-of-vehicle device, to generate electrical signals in electric lines, and to transfer the request message; a response message request unit configured to request response messages for the request message from one or more devices constituting an in-vehicle network based on one or more of the electric lines in which electrical signals have been generated; and a response message transmission unit configured to receive the response messages from the one or more devices, and to transfer the response messages to the out-of-vehicle device via unidirectional communication.

The response message request unit may select one or more request flags corresponding to one or more electric lines in which the electrical signals have been generated based on request flags set in the respective electric lines, and may request the response messages from the one or more devices based on the one or more request flags.

The request message reception unit may select the one or more request flags corresponding to the content of the request message by checking the content of the request message, and may generate the electrical signals in the one or more of the electric lines that correspond to the one or more request flags.

The electrical signals may be generated when power is supplied to the electric lines.

The unidirectional communication may be performed using a method of transferring data only in a direction from the out-of-vehicle device interface apparatus to the out-of-vehicle device without including a communication line over which data is transferred from the out-of-vehicle device to the out-of-vehicle device interface apparatus.

The request message reception unit may include a device authentication unit configured to perform authentication on the out-of-vehicle device; and a request message checking unit configured to determine whether a response to the content of the request message can be made via the devices that constitute the in-vehicle network.

The request message checking unit may determine whether the response to the content of the request message can be made via the devices that constitute the in-vehicle network if the authentication of the out-of-vehicle device is successful.

The request message checking unit may send a response impossibility message to the out-of-vehicle device if the response to the content of the request message cannot be made via the devices that constitute the in-vehicle network.

In accordance with another aspect of the present invention, there is provided a method of requesting a response message, including receiving a request message from an out-of-vehicle device; generating electrical signals in electric lines, and transferring the request message; and requesting response messages for the request message from one or more devices constituting an in-vehicle network based on one or more of the electric lines in which the electrical signals have been generated.

Requesting the response messages may include selecting one or more request flags corresponding to one or more electric lines in which electrical signals have been generated based on request flags set in the respective electric lines; and the response messages may be requested from the one or more devices based on the one or more request flags.

Transferring the request message may include selecting the one or more request flags corresponding to content of the request message by checking content of the request message; and the electrical signals may be generated in the one or more electric lines that correspond to the one or more request flags.

The electrical signals may be generated when power is supplied to the electric lines.

Receiving the request message may include performing authentication on the out-of-vehicle device; and determining whether a response to the content of the request message can be made via the devices that constitute the in-vehicle network.

Determining whether the response to the content of the request message can be made may include, if the authentication of the out-of-vehicle device is successful, determining whether the response to the content of the request message can be made.

Determining whether the response to the content of the request message can be made may include, if the response to the content of the request message cannot be made via the devices that constitute the in-vehicle network, sending a response impossibility message to the out-of-vehicle device.

In accordance with still another aspect of the present invention, there is provided a method of sending a response message, including receiving response messages from one or more devices that constitute an in-vehicle network; and sending the response messages to an out-of-vehicle device via unidirectional communication.

The unidirectional communication may be performed using a method of transferring data only in a direction from the out-of-vehicle device interface apparatus to the out-of-vehicle device without including a communication line over which data is transferred from the out-of-vehicle device to the out-of-vehicle device interface apparatus.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
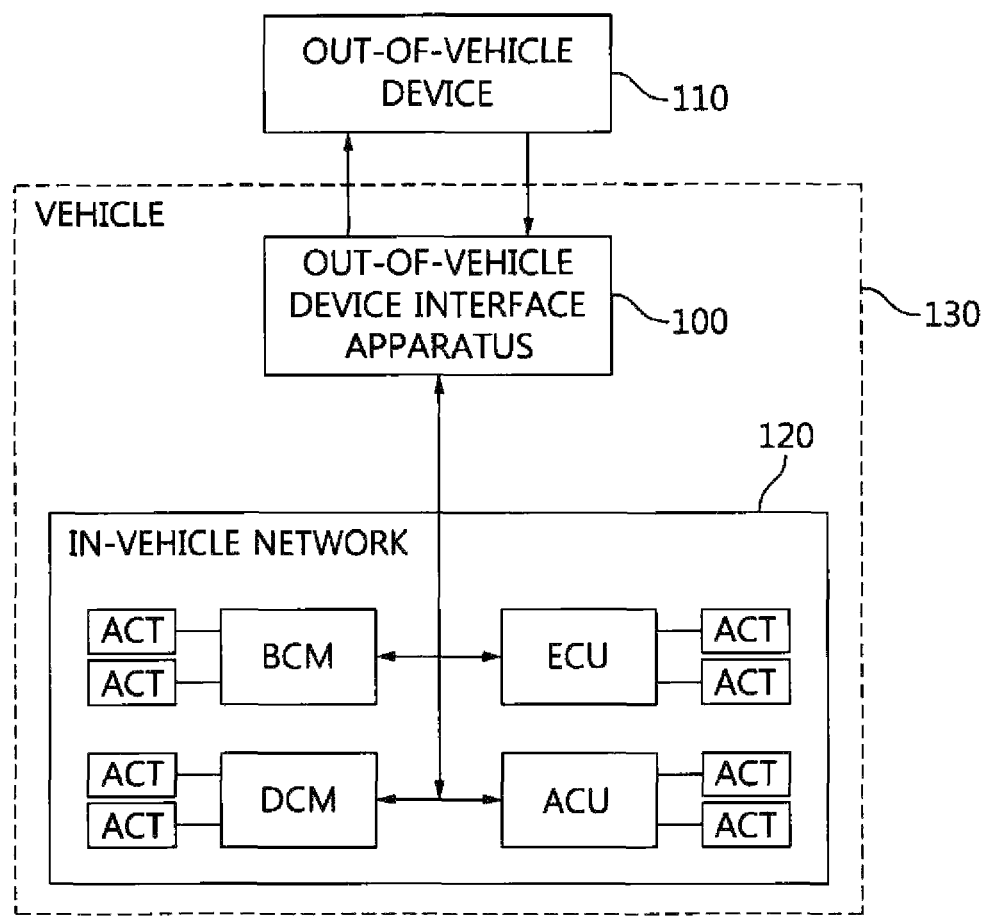
FIG. 1 a diagram illustrating an out-of-vehicle device interface system according to an embodiment of the present invention.

Embodiments of the present invention will be described in detail below with reference to the accompanying drawings. Repeated descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

Embodiments of the present invention are described in detail with reference to the accompanying diagrams.

FIG. 1 a diagram illustrating an out-of-vehicle device interface system according to an embodiment of the present invention.

Referring to FIG. 1, the out-of-vehicle device interface system according to the present embodiment may include an out-of-vehicle device interface apparatus 100 included in a vehicle 130, an in-vehicle network 120, and an out-of-vehicle device 110 located outside the vehicle 130.

The out-of-vehicle device interface apparatus 100 may receive a request message from the out-of-vehicle device 110, and may generate electrical signals in electric lines and transfer a request message.

In this case, one or more of request flags that are set in the respective electric lines and that correspond to the content of the request message may be selected by checking the content of the request message. Thereafter, electrical signals may be generated in one or more electric lines that correspond to the one or more request flags. For example, if the content of the request message corresponds to a request for the checking of a device A within the vehicle 130, an electrical signal may be generated in an electric line that corresponds to a flag requesting data on the checking of the device A.

The electrical signal may be generated when power is supplied to the electric line. For example, if an electric line is waiting because a request message has not been received from the out-of-vehicle device 110, the electric line may maintain the OFF state by blocking power that is supplied to the electric line. If an electrical signal should be generated in the electric line because a request message has been received from the out-of-vehicle device 110, the electric line may be switched from the OFF state to an ON state by supplying power to the electric line, and thus the electrical signal can be generated.

In this case, authentication may be performed on the out-of-vehicle device 110. For example, information about the out-of-vehicle device 110 may be previously registered in the out-of-vehicle device interface apparatus 100. Thereafter, when the out-of-vehicle device 110 accesses the out-of-vehicle device interface apparatus 100 in order to send a request message to the vehicle 130, the out-of-vehicle device 110 may be authenticated by determining whether it has been registered in the out-of-vehicle device interface apparatus 100.

If the accessing out-of-vehicle device 110 is an external device not registered in the out-of-vehicle device interface apparatus 100, a device authentication failure message may be sent to the external device.

In this case, it may be determined whether a response to the content of the request message can be made via devices that constitute the in-vehicle network 120.

If the authentication of the out-of-vehicle device 110 is successful, it may be determined whether a response can be made.

If a response to the content of the request message cannot be made via the devices that constitute the in-vehicle network 120, a response impossibility message may be transferred to the out-of-vehicle device 110.

The out-of-vehicle device interface apparatus 100 may request response messages for the request message from one or more of the devices constituting the in-vehicle network 120 based on one or more electric lines in which electrical signals have been generated.

In this case, one or more request flags that correspond to the one or more electric lines in which the electrical signals have been generated may be selected based on request flags that are set in the respective electric lines. Thereafter, response messages may be requested from the one or more devices based on the one or more request flags. For example, if a request flag corresponding to an electric line in which an electrical signal has been generated is a request, for the checking of a device B that constitute part of the in-vehicle network 120, a response message, such as the result of the checking, may be requested from the device B.

The out-of-vehicle device interface apparatus 100 may receive response messages from the one or more devices constituting the in-vehicle network 120, and may send a response message to the out-of-vehicle device 110 via unidirectional communication.

In this case, the unidirectional communication may be communication using a method of transferring data only in the direction from the out-of-vehicle device interface apparatus 100 to the out-of-vehicle device 110 without including a communication line for sending data from the out-of-vehicle device 110 to the out-of-vehicle device interface apparatus 100. A path for malicious access behavior that may occur outside the vehicle 130 can be blocked because data is transferred to the out-of-vehicle device 110 using the unidirectional communication method.

The out-of-vehicle device 110 may be a device that controls the vehicle 130 outside the vehicle 130 or obtains information using the in-vehicle network 120. For example, the out-of-vehicle device 110 may be a device that checks the state of the vehicle or accesses the vehicle to perform auto-parking.

The in-vehicle network 120 may be a network to which many devices having various functions, such as the acceleration, steering, braking, vehicle body control, volume control and air-conditioning control of the vehicle 130, are connected.

Information may be exchanged between the vehicle 130 and a driver, and the control of the vehicle 130 may be performed over the in-vehicle network 120.

Figure 2:
FIG. 2 is a block diagram illustrating an example of the out-of-vehicle device interface apparatus of FIG. 1.

FIG. 2 is a block diagram illustrating an example of the out-of-vehicle device interface apparatus of FIG. 1.

Referring to FIG. 2, the out-of-vehicle device interface apparatus 100 of FIG. 1 may include a request message reception unit 210, a response message request unit 220, and a response message transmission unit 230.

The request message reception unit 210 may receive a request message from an out-of-vehicle device, may generate electrical signals in electric lines, and may send a request message.

One or more request flags that are set in the respective electric lines and that correspond to the content of a request message may be selected by checking the content of the request message. Thereafter, electrical signals may be generated in one or more electric lines that correspond to the one or more request flags. For example, if the content of the request message is a request for the checking of a device A within the vehicle, an electrical signal may be generated in an electric line that corresponds to a flag requesting data on the checking of the device A.

The electrical signal may be generated when power is supplied to the electric line. For example, if an electric line is waiting because a request message has not been received from the out-of-vehicle device, the electric line may maintain an OFF state by blocking power that is supplied to the electric, line. If an electrical signal should be generated in the electric line because a request message has been received from the out-of-vehicle device, the electric line may be switched from the OFF state to an ON state by supplying power to the electric line, and thus the electrical signal can be generated.

In this case, authentication may be performed on the out-of-vehicle device. For example, information about the out-of-vehicle device may be previously registered in the out-of-vehicle device interface apparatus 100. Thereafter, when the out-of-vehicle device accesses the out-of-vehicle device interface apparatus 100 in order to send a request message, whether the out-of-vehicle device has been registered in the out-of-vehicle device interface apparatus 100 may be checked, and authentication may be performed on the out-of-vehicle device.

If the accessing out-of-vehicle device is an external device not registered in the out-of-vehicle device interface apparatus 100, the out-of-vehicle device interface apparatus 100 may send a device authentication failure message to the external device.

In this case, whether a response to the content of the request message may be made via devices constituting an in-vehicle network may be determined.

If the authentication of the out-of-vehicle device is successful, whether a response to the content of the request message may be made via the devices that constitute the in-vehicle network may be determined.

If a response to the content of the request message cannot be made via the devices that constitute the in-vehicle network, a response impossibility message may be sent to the out-of-vehicle device.

The response message request unit 220 may request response messages for a request message from one or more of devices that constitute an in-vehicle network based on one or more electric lines in which electrical signals have been generated.

One or more request flags that correspond to the one or more electric lines in which the electrical signals have been generated may be selected based on request flags that are set in the respective electric lines. Thereafter, the response message request unit 220 may request response messages from the one or more devices based on the one or more request flags. For example, if a request flag corresponding to an electric line in which an electrical signal has been generated is a request for the checking of a device B that constitutes part of an in-vehicle network, the response message request unit 220 may request a response message, such as the result of the checking, from the device B.

The response message transmission unit 230 may receive response messages from one or more devices constituting an in-vehicle network, and may send a response message to an out-of-vehicle device via unidirectional communication.

The unidirectional communication may be communication using a method of transferring data only in the direction from the out-of-vehicle device interface apparatus 100 to the out-of-vehicle device without including a communication line for sending data from the out-of-vehicle device to the out-of-vehicle device interface apparatus 100. A path for malicious access behavior that may occur outside the vehicle can be blocked because data is transferred to the out-of-vehicle device using the unidirectional communication method.

The lives of a driver and passengers within a vehicle can be protected by enhancing the security of the in-vehicle network using the out-of-vehicle device interface apparatus 100. Furthermore, it is possible to enable existing vehicle checking functions to be normally performed while preventing abnormal vehicle body control from being performed from the outside of a vehicle using a physical unidirectional communication technology.

Figure 3:
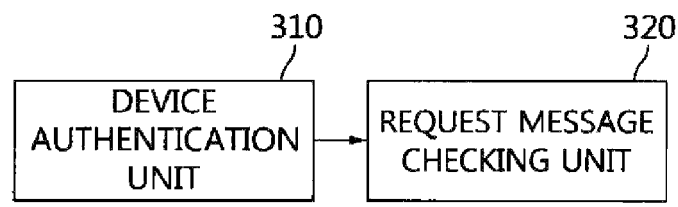
FIG. 3 is, a block diagram illustrating an example of a request message reception unit of FIG. 2.

FIG. 3 is a block diagram illustrating an example of the request message reception unit of FIG. 2.

Referring to FIG. 3, the request message reception unit 210 of FIG. 2 may include a device authentication unit 310, and a request message checking unit 320.

The device authentication unit 310 may perform authentication on an out-of-vehicle device. For example, information about an out-of-vehicle device may be previously registered in the device authentication unit 310. Thereafter, when the out-of-vehicle device accesses the out-of-vehicle device interface apparatus 100 in order to send a request message to a vehicle, the device authentication unit 310 may check whether the out-of-vehicle device has been registered in the device authentication unit 310, and may perform authentication on the out-of-vehicle device.

If the accessing out-of-vehicle device is an external device not registered in the device authentication unit 310, the device authentication unit 310 may send a device authentication failure message to the external device.

The request message checking unit 320 may determine whether a response to the content of the request message may be made via devices that constitute an in-vehicle network.

If the authentication of the out-of-vehicle device is successful, the request message checking unit 320 may determine whether a response to the content of the request message may be made via devices that constitute an in-vehicle network.

If a response to the content of the request message cannot be made via the devices that constitute the in-vehicle network, the request message checking unit 320 may send a response impossibility message to the out-of-vehicle device.

Figure 4:
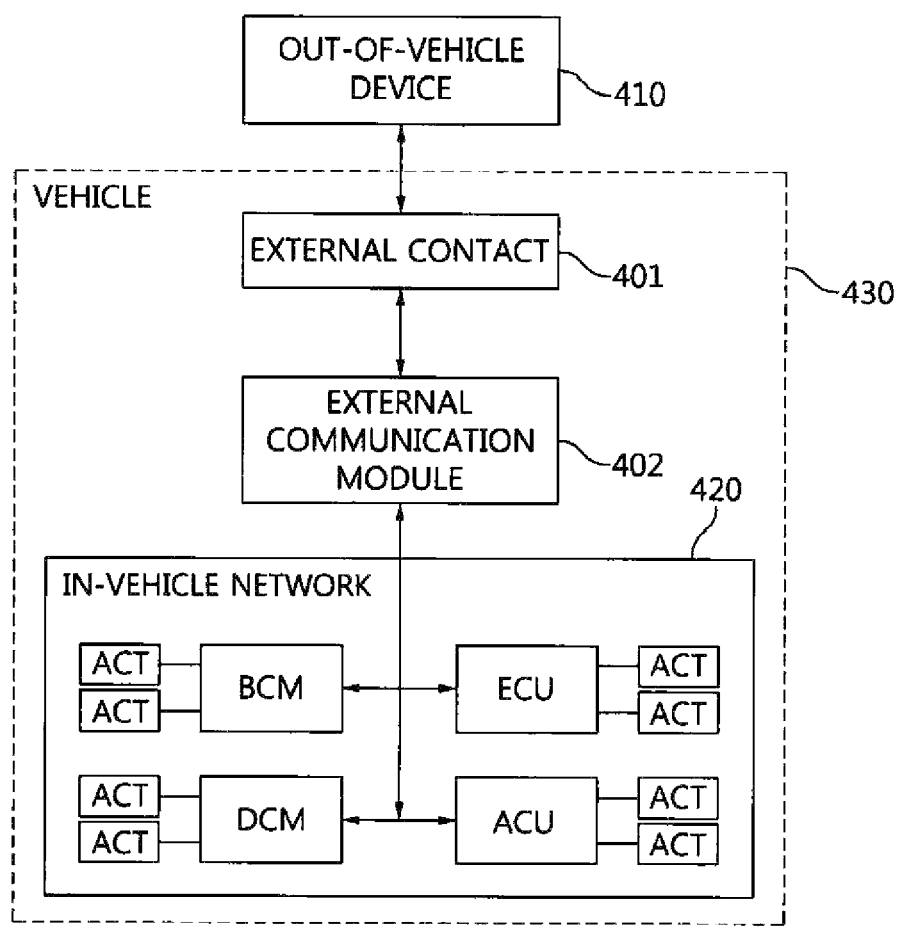
FIG. 4 is a diagram illustrating a communication structure for an in-vehicle network and an out-of-vehicle device.

FIG. 4 is a diagram illustrating a communication structure for an in-vehicle network and an out-of-vehicle device.

Referring to FIG. 4, an external communication module 402 included in a vehicle 430 may function as an intermediator for the outside through communication with an in-vehicle network 420.

An external contact 401 may function as an intermediator by mounting and connecting an out-of-vehicle device 410 on and to the vehicle 430 so that the out-of-vehicle device 410 can communicate with the external communication module 402.

The out-of-vehicle device 410 may send a request message for checking the state of the vehicle, or may receive response messages for a request message and display the request message or response messages to a driver or a user.

For example, if a driver or user makes a request for the checking of the vehicle 430, the driver or user may mount and connect the out-of-vehicle device 410 on and to the external contact 401 and then request the checking of the vehicle 430.

The external contact 401 may transfer the vehicle checking request from the out-of-vehicle device 410 to the external communication module 402.

In this case, the external communication module 402 may transfer the vehicle checking request to each device over the in-vehicle network 420 in order to allow checking, corresponding to the content of the vehicle checking request, to be performed.

Each of the devices constituting the in-vehicle network 420 may return a result value for the vehicle checking request to the external communication module 402.

The external communication module 402 may transfer the received result value to the out-of-vehicle device 410 via the external contact 401.

The out-of-vehicle device 410 may display the received, result value to the driver or user.

In this case, all types of communication between the out-of-vehicle device 410 and the vehicle 430 may be performed via bidirectional communication. Accordingly, a malicious attack and malicious control intended for the inside of the vehicle 130 may be possible.

Figure 5:
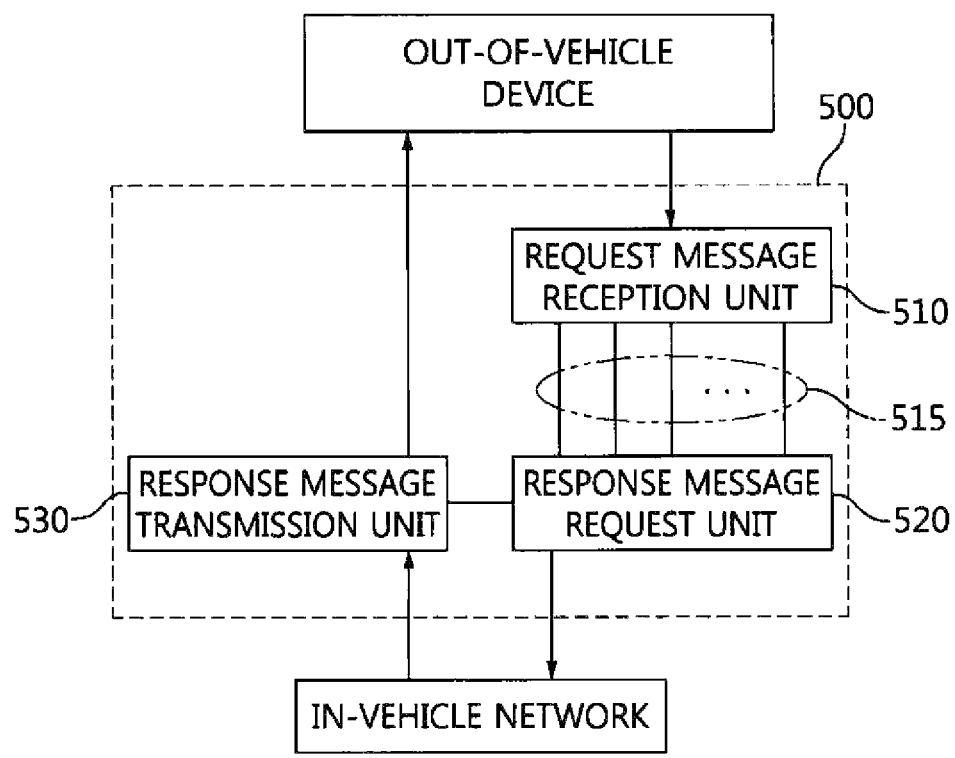
FIG. 5 is a diagram illustrating a communication structure for an out-of-vehicle device interface apparatus according to an embodiment of the present invention.

FIG. 5 is a diagram illustrating a communication structure for an out-of-vehicle device interface apparatus according to an embodiment of the present invention.

Referring to FIG. 5, the out-of-vehicle device interface apparatus 500 included in a vehicle may function as an intermediator for an in-vehicle network and an out-of-vehicle device.

For example, if a driver or user makes a vehicle checking request, a request message reception unit 510 may receive the vehicle checking request from the out-of-vehicle device.

The request message reception unit 510 may transfer the vehicle checking request to a response message request unit 520 in the form of electrical signals using electric lines 515.

The response message request unit 520 may determine one or more of the electric lines 515 in which electrical signals have been generated, and may request the checking of the vehicle from the in-vehicle network based on request flags that correspond to the one or more electric lines.

The response message transmission unit 530 may receive a vehicle checking result from the in-vehicle network. Thereafter, a response message transmission unit 530 may transfer the vehicle checking result to the out-of-vehicle device via unidirectional communication.

The out-of-vehicle device may display the received vehicle checking result to the driver or the user.

Since the vehicle checking result generated by the in-vehicle network is transferred to the out-of-vehicle device through the out-of-vehicle device interface apparatus 500 via unidirectional communication, a malicious attack and malicious control that may occur in a communication structure for an existing out-of-vehicle device can be preemptively prevented. Furthermore, problems that may occur due to the use of unidirectional communication can be overcome because a vehicle checking request transferred by an outof-vehicle device can be transferred through the request message reception unit 510 of the out-of-vehicle device interface apparatus 500 in the form of an electrical signal.

Figure 6:
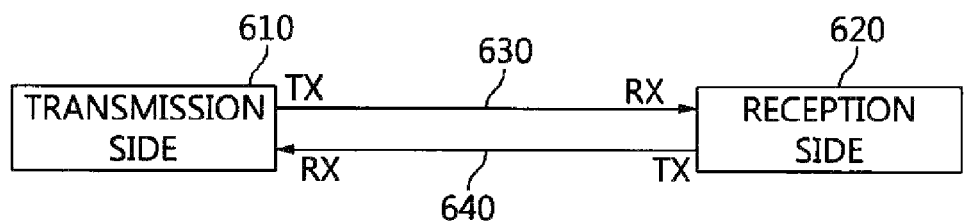
FIG. 6 is a diagram illustrating bidirectional communication.
Figure 7:
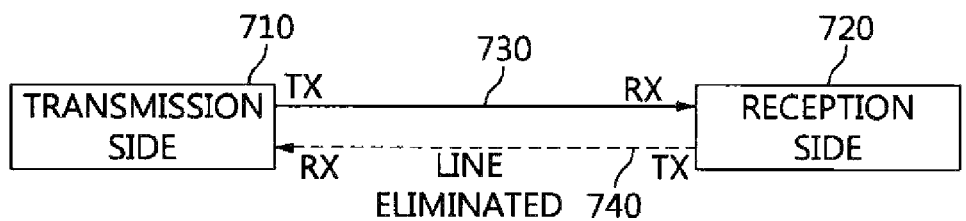
FIG. 7 is a diagram illustrating physical unidirectional communication.

FIG. 6 is a diagram illustrating bidirectional communication, and FIG. 7 is a diagram illustrating physical unidirectional communication.

FIGS. 6 and 7 illustrate a structure for bidirectional communication and a structure for physical unidirectional communication that are used in communication between an out-of-vehicle device and an in-vehicle network.

First, assuming that the in-vehicle network is a transmission side 610 and the out-of-vehicle device is a reception side 620, the in-vehicle network and the out-of-vehicle device may exchange data over communication lines 630 and 640.

In this case, the out-of-vehicle device may perform a malicious attack and malicious control on the in-vehicle network over the communication line 640.

Accordingly, assuming that an in-vehicle network is the transmission side 710 and an out-of-vehicle device is the reception side 720 as in a unidirectional communication structure, such as that of FIG. 7, a malicious attack from the out-of-vehicle device can be preemptively blocked by eliminating a communication line 740.

Figure 8:
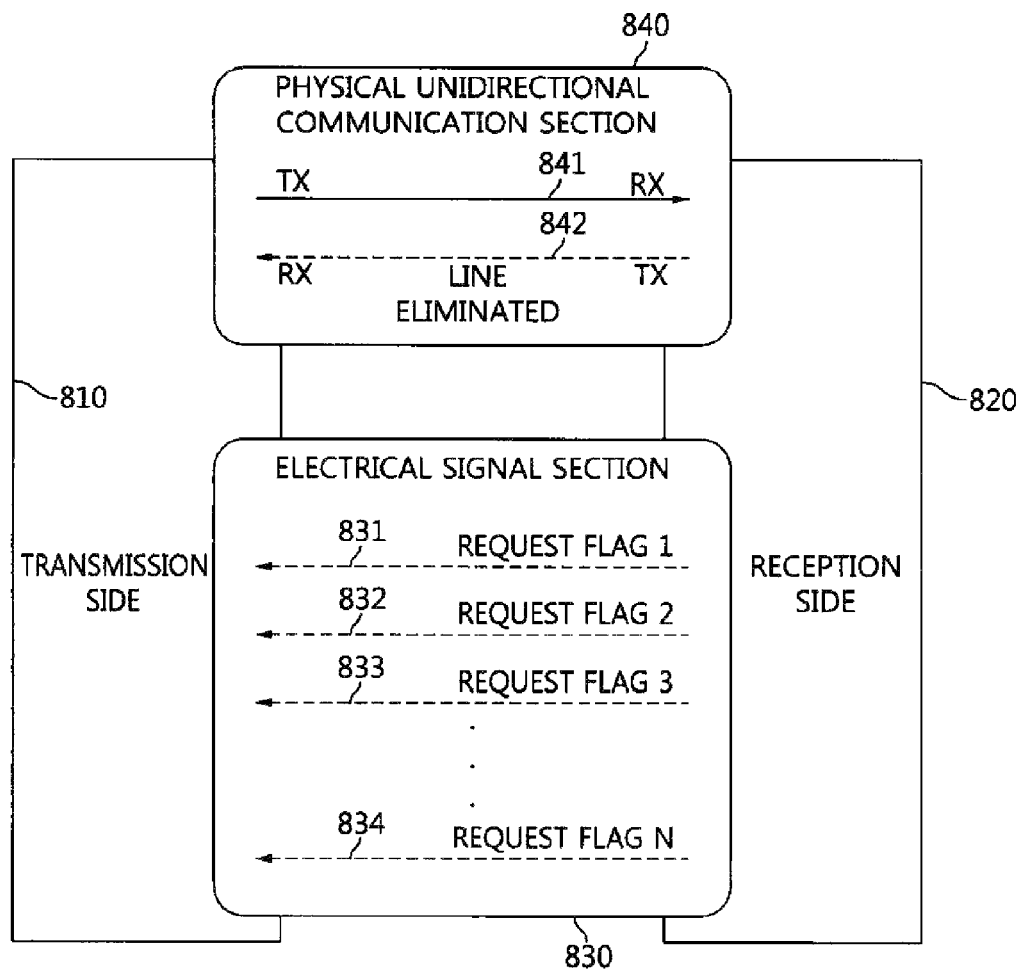
FIG. 8 is a diagram illustrating a request transmission and response process according to an embodiment of the present invention.

FIG. 8 is a diagram illustrating a request transmission and response process according to an embodiment of the present invention.

Referring to FIG. 8, in the request transmission and response process according to the present embodiment, first, it may be assumed that an in-vehicle network is a transmission side 810 and an out-of-vehicle device is a reception side 820.

The reception side 820 may send a request message to the transmission side 810.

The reception side 820 may send the request message to the transmission side 810 through the electrical signal section 830 of an out-of-vehicle device interface apparatus included in a vehicle. Via the out-of-vehicle device interface apparatus, the content of the request message may be checked, and request flags that are set in the respective electric lines 831, 832, 833 and 834 and that correspond to the content of the request message may be selected. Thereafter, electrical signals may be generated in the electric lines 831, 832, 833 and 834 that correspond to the selected request flags. For example, if request flags corresponding to the content of the request message are request flags 1 and 2, electrical signals may be generated in the electric line 831 and the electric line 832.

The out-of-vehicle device interface apparatus may determine the electric lines 831 and 832 of the electric lines 831, 832, 833 and 834 in which electrical signals have been generated, and may request response messages from the transmission side 810 based on the request flags 1 and 2 corresponding to the electric lines 831 and 832 in which the electrical signals have been generated. For example, if the electrical signals have been generated in the electric line 831 and the electric line 832, response messages may be requested from the transmission side 810 based on the request flag 1 and the request flag 2.

In this case, the transmission side 810 may send the response messages to the reception side 820.

The transmission side 810 may send the response messages to the reception side 820 through the physical unidirectional communication section 840 of the out-of-vehicle device interface apparatus included in the vehicle. The transmission side 810 may send the response messages to the reception side 820 over a communication line 841 over which data can be transmitted from the out-of-vehicle device interface apparatus to the reception side 820 in the physical unidirectional communication section 840.

Accordingly, the in-vehicle network can be protected against a malicious attack and malicious control that may occur from the out-of-vehicle device corresponding to the reception side 820 because a communication line 842 over which data can be transmitted from the reception side 820 to the out-of-vehicle device interface apparatus may be eliminated.

Figure 9:
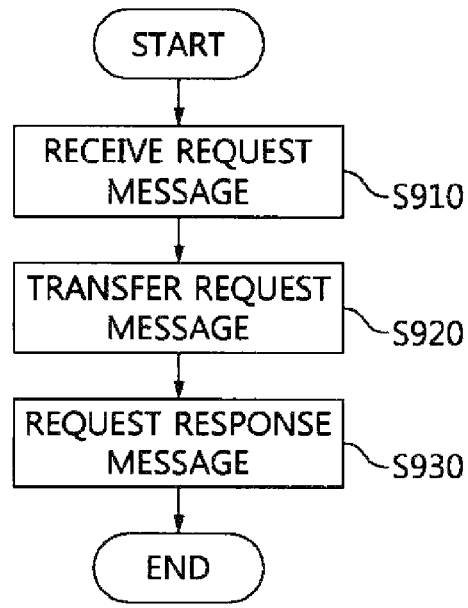
FIG. 9 is a flowchart illustrating a method of requesting a response message according to an embodiment of the present invention.

FIG. 9 is a flowchart illustrating a method of requesting a response message according to an embodiment of the present invention.

Referring to FIG. 9, in the method of requesting a response message according to the present embodiment, a request message may be received from an out-of-vehicle device at step S910.

In this case, authentication may be performed on the out-of-vehicle device. For example, information about the out-of-vehicle device may be previously registered in an out-of-vehicle device interface apparatus. Thereafter, when the out-of-vehicle device accesses the out-of-vehicle device interface apparatus in order to transfer the request message to a vehicle, whether the accessing out-of-vehicle device has been registered in the out-of-vehicle device interface apparatus may be checked, and authentication may be performed on the out-of-vehicle device.

If the accessing out-of-vehicle device is an external device not registered in the out-of-vehicle device interface apparatus, the out-of-vehicle device interface apparatus may send a device authentication failure message to the external device.

In this case, the out-of-vehicle device interface apparatus may determine whether a response to the content of the request message may be made via devices that constitute an in-vehicle network.

If the authentication of the out-of-vehicle device is successful, the out-of-vehicle device interface apparatus may determine whether a response to the content of the request message may be made via devices that constitute the in-vehicle network.

If a response to the content of the request message cannot be made via the devices that constitute the in-vehicle network, the out-of-vehicle device interface apparatus may send a response impossibility message to the out-of-vehicle device.

Furthermore, in the method of requesting a response message according to the present embodiment, electrical signals may be generated in electric lines and then a request message may be transferred to the vehicle at step S920.

In this case, the content of the request message may be checked, and one or more request flags that are set in the respective electric lines and that correspond to the one or more electric lines may be selected. Thereafter, the electrical signals may be generated in the one or more electric lines that belong to the electric lines and that correspond to the one or more request flags. For example, if the content of the request message is a request for the checking of a device A within the vehicle, an electrical signal may be generated in an electric line that corresponds to a flag requesting data on the checking of the device A.

The electrical signal may be generated when power is supplied to the electric line. For example, if an electric line is waiting because a request message has not been received from the out-of-vehicle device, the electric line may maintain an OFF state by blocking power that is supplied to the electric line. If an electrical signal should be generated in the electric line because the request message has been received from the out-of-vehicle device, the electric line may be switched from the OFF state to an ON state by supplying power to the electric line, and thus the electrical signal can be generated.

Furthermore, in the method of requesting a response message according to the present embodiment, response messages for the request message may be requested from one or more devices constituting the in-vehicle network based on the one or more electric lines in which electrical signals have been generated at step S930.

In this case, one or more request flags that correspond to the one or more electric lines in which the electrical signals have been generated may be selected based on request flags that are set in the respective electric lines. Thereafter, the out-of-vehicle device interface apparatus may request response messages from the one or more devices based on the one or more request flags. For example, if a request flag corresponding to an electric line in which an electrical signal has been generated is a request for the checking of a device B that constitutes part of the in-vehicle network, a response message, such as the result of the checking, may be requested from the device B.

Figure 10:
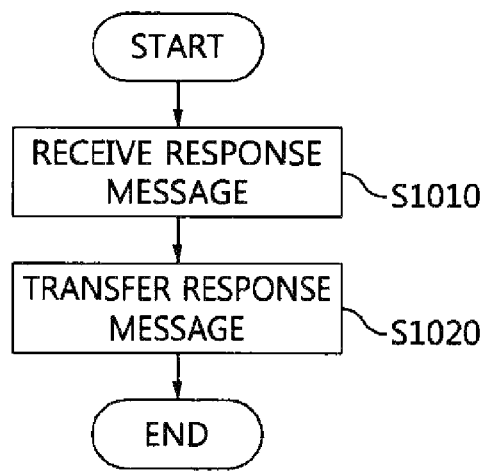
FIG. 10 is a flowchart illustrating a method of transferring a response message according to an embodiment of the present invention.

FIG. 10 is a flowchart illustrating a method of transferring a response message according to an embodiment of the present invention.

Referring to FIG. 10, in the method of transferring a response message according to the present embodiment, response messages may be received from one or more devices constituting an in-vehicle network at step S1010.

Furthermore, in the method of transferring a response message according to the present embodiment, the response messages may be sent to an out-of-vehicle device via unidirectional communication at step S1020.

In this case, the unidirectional communication may be communication using a method of transferring data only in the direction from the out-of-vehicle device interface apparatus to the out-of-vehicle device without including a communication line for sending data from the out-of-vehicle device to the out-of-vehicle device interface apparatus. A path for malicious access behavior that may occur outside the vehicle can be blocked because data is transferred to the out-of-vehicle device using such a unidirectional communication method.

Figure 11:
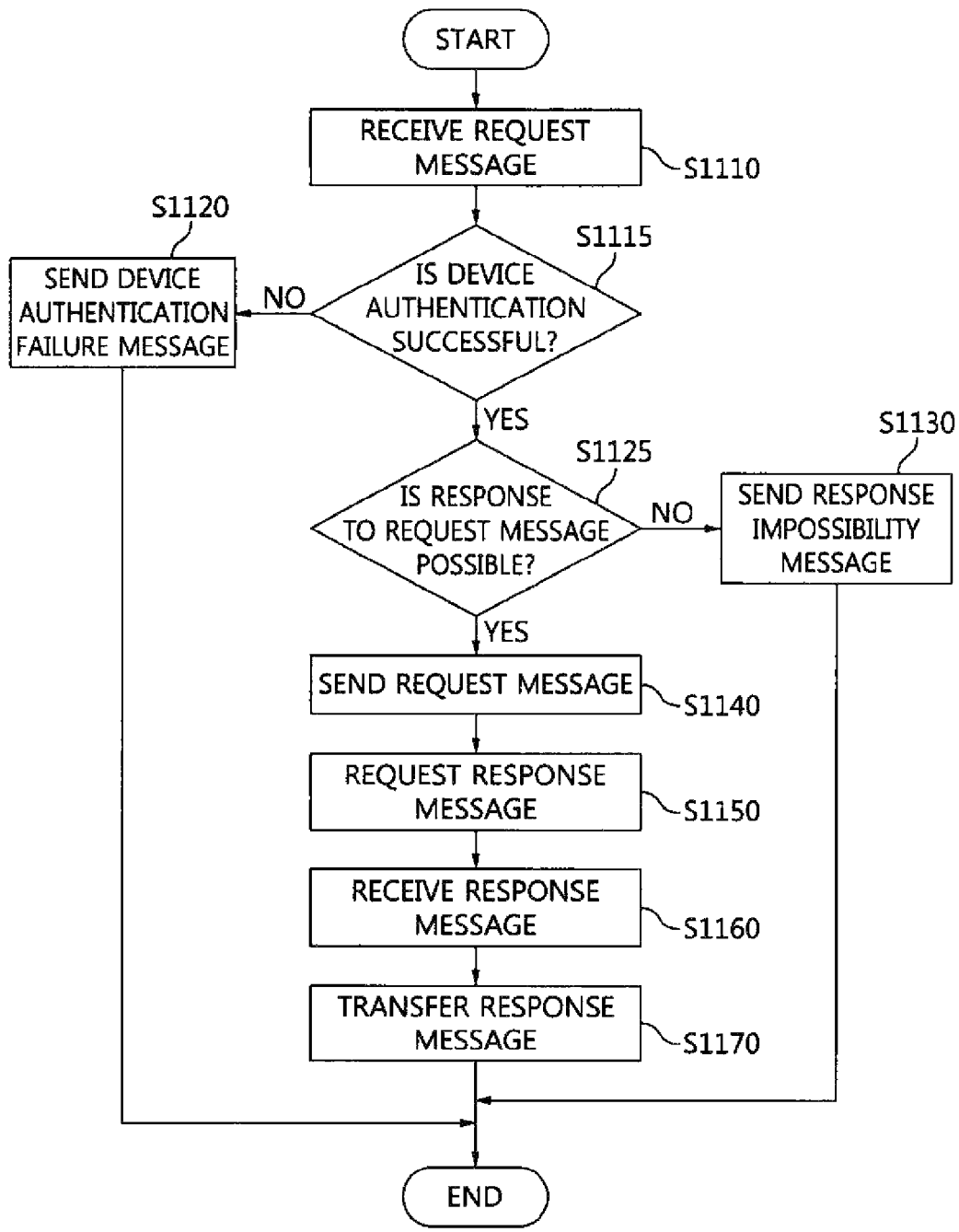
FIG. 11 is a detailed flowchart illustrating an out-of-vehicle device interface method according to an embodiment of the present invention.

FIG. 11 is a detailed flowchart illustrating an out-of-vehicle device interface method according to an embodiment of the present invention.

Referring to FIG. 11, in the out-of-vehicle device interface method according to the present embodiment, a request message may be received from an out-of-vehicle device at step S1110.

Furthermore, whether the authentication of the out-of-vehicle device is successful may be determined by performing the authentication on the out-of-vehicle device at step S1115.

If, as a result of the determination at step S1115, it is determined that the authentication of the out-of-vehicle device is unsuccessful, a device authentication failure message may be sent to the out-of-vehicle device at step S1120.

If, as a result of the determination at step S1115, it is determined that the authentication of the out-of-vehicle device is successful, whether a response to the content of the request message can be made via devices constituting an in-vehicle network may be determined at step S1125.

If, as a result of the determination at step S1125, it is determined that a response to the content of the request message cannot be made via the devices that constitute the in-vehicle network, a response impossibility message may be sent to the out-of-vehicle device at step S1130.

If, as a result of the determination at step S1125, it is determined that a response to the content of the request message can be made via the devices that constitute the in-vehicle network, electrical signals may be generated in electric lines and the request message may be transferred at step S1140.

Furthermore, response messages for the request message may be requested from one or more of the devices constituting the in-vehicle network based on one or more electric lines in which electrical signals have been generated at step S1150.

Furthermore, the response messages, may be received from the one or more devices constituting the in-vehicle network at step S1160.

Furthermore, the response messages may be transferred to the out-of-vehicle device via unidirectional communication at step S1170.

If the out-of-vehicle device interface method is used, a path via which malicious behavior may be performed can be blocked by applying a physical unidirectional communication technology to an out-of-vehicle device that is accessing the vehicle.

As described above, in accordance with at least one embodiment of the present invention, a path through which malicious behavior can be performed can be blocked by applying physical unidirectional communication technology to an out-of-vehicle device that is accessing a vehicle.

Furthermore, in accordance with at least one embodiment of the present invention, the lives of a driver and passengers within a vehicle can be protected by enhancing the security of an in-vehicle network.

Furthermore, in accordance with at least one embodiment of the present invention, it is possible to enable existing vehicle checking functions to be normally performed while preventing abnormal vehicle body control from being performed from the outside of a vehicle using a physical unidirectional communication technology.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An out-of-vehicle device interface apparatus, comprising:
   a request message reception unit configured to receive a request message from an out-of-vehicle device, to generate electrical signals in electric lines, and to transfer the request message;
   a response message request unit configured to request response messages for the request message from one or more devices constituting an in-vehicle network based on one or more of the electric lines in which electrical signals have been generated; and
   a response message transmission unit configured to receive the response messages from the one or more devices, and to transfer the response messages to the out-of-vehicle device via unidirectional communication,
   wherein the response message request unit selects one or more request flags corresponding to one or more electric lines in which the electrical signals have been generated based on request flags set in the respective electric lines, and requests the response messages from the one or more devices based on the one or more request flags.

2. The out-of-vehicle device interface apparatus of claim 1, wherein the request message reception unit selects the one or more request flags corresponding to content of the request message by checking the content of the request message, and generates the electrical signals in the one or more of the electric lines that correspond to the one or more request flags.

3. The out-of-vehicle device interface apparatus of claim 2, wherein the electrical signals are generated when power is supplied to the electric lines.

4. The out-of-vehicle device interface apparatus of claim 3, wherein the unidirectional communication is performed using a method of transferring data only in a direction from the out-of-vehicle device interface apparatus to the out-of-vehicle device without including a communication line over which data is transferred from the out-of-vehicle device to the out-of-vehicle device interface apparatus.

5. The out-of-vehicle device interface apparatus of claim 2, wherein the request message reception unit comprises:
a device authentication unit configured to perform authentication on the out-of-vehicle device; and
a request message checking unit configured to determine whether a response to the content of the request message can be made via the devices that constitute the in-vehicle network.

6. The out-of-vehicle device interface apparatus of claim 5; wherein the request message checking unit determines whether the response to the content of the request message can be made via the devices that constitute the in-vehicle network if the authentication of the out-of-vehicle device is successful.

7. The out-of-vehicle device interface apparatus of claim 6, wherein the request message checking unit sends a response impossibility message to the out-of-vehicle device if the response to the content of the request message cannot be made via the devices that constitute the in-vehicle network.

8. A method of requesting a response message, comprising:
receiving a request message from an out-of-vehicle device;
generating electrical signals in electric lines, and transferring the request message; and
requesting response messages for the request message from one or more devices constituting an in-vehicle network based on one or more of the electric lines in which the electrical signals have been generated, wherein:
requesting the response messages comprises selecting one or more request flags corresponding to one or more electric lines in which electrical signals have been generated based on request flags set in the respective electric lines; and
the response messages are requested from the one or more devices based on the one or more request flags.

9. The method of claim 8, wherein:
transferring the request message comprises selecting the one or more request flags corresponding to content of the request message by checking content of the request message; and
the electrical signals are generated in the one or more electric lines that correspond to the one or more request flags.

10. The method of claim 9, wherein the electrical signals are generated when power is supplied to the electric lines.

11. The method of claim 9, wherein receiving the request message comprises:
performing authentication on the out-of-vehicle device; and
determining whether a response to the content of the request message can be made via the devices that constitute the in-vehicle network.

12. The method of claim 11, wherein determining whether the response to the content of the request message can be made comprises, if the authentication of the out-of-vehicle device is successful, determining whether the response to the content of the request message can be made.

13. The method of claim 12, wherein determining whether the response to the content of the request message can be made comprises, if the response to the content of the request message cannot be made via the devices that constitute the in-vehicle network, sending a response impossibility message to the out-of-vehicle device.

14. A method performed by an out-of-vehicle device interface apparatus comprising:
requesting response messages for a request message from one or more devices constituting an in-vehicle network based on one or more of electric lines in which electrical signals have been generated,
receiving response messages from the one or more devices that constitute the in-vehicle network; and
sending the response messages to an out-of-vehicle device via unidirectional communication, wherein:
requesting the response messages comprises selecting one or more request flags corresponding to the one or more electric lines in which electrical signals have been generated based on request flags set in the respective electric lines; and
the response messages are requested from the one or more devices based on the one or more request flags.

15. The method of claim 14, wherein the unidirectional communication is performed using a method of transferring data only in a direction from the out-of-vehicle device interface apparatus to the out-of-vehicle device without including a communication line over which data is transferred from the out-of-vehicle device to the out-of-vehicle device interface apparatus.

* * * * *